United States Patent
Ramoutar et al.

(10) Patent No.: US 12,068,875 B2
(45) Date of Patent: Aug. 20, 2024

(54) CONFERENCING PLATFORM INTEGRATION WITH INFORMATION ACCESS CONTROL

(71) Applicant: DocuSign, Inc., San Francisco, CA (US)

(72) Inventors: Anthony Joseph Ramoutar, San Francisco, CA (US); Angel Azmavet Garcia Reyes, El Paso, TX (US); Ellis David Berner, Mercer Island, WA (US); Dorra Belhadj Ali, San Francisco, CA (US); Billy Travis Williams, Alameda, CA (US); David Soh, Fullerton, CA (US)

(73) Assignee: DOCUSIGN, INC., San Francisco, CA (US)

( * ) Notice: Subject to any disclaimer, the term of this patent is extended or adjusted under 35 U.S.C. 154(b) by 2 days.

(21) Appl. No.: 17/588,140

(22) Filed: Jan. 28, 2022

(65) Prior Publication Data
US 2023/0246866 A1   Aug. 3, 2023

(51) Int. Cl.
*H04L 12/18* (2006.01)
*G06F 16/332* (2019.01)
(Continued)

(52) U.S. Cl.
CPC ...... *H04L 12/1831* (2013.01); *G06F 16/3326* (2019.01); *G06F 16/93* (2019.01); *H04L 12/1822* (2013.01); *H04N 7/155* (2013.01)

(58) Field of Classification Search
CPC . H04L 12/1831; H04L 12/1822; G06F 16/93; G06F 16/3326; H04N 7/155
See application file for complete search history.

(56) References Cited

U.S. PATENT DOCUMENTS 9,954,683 B2    4/2018   Ali et al.
10,049,170 B1 *  8/2018   Long .................... G06F 16/986
(Continued)

OTHER PUBLICATIONS

U.S. Appl. No. 17/588,138, filed Jan. 28, 2022, naming inventors Ramoutar et al.

*Primary Examiner* — William G Trost, IV
*Assistant Examiner* — Abdelbasst Talioua
(74) *Attorney, Agent, or Firm* — Shumaker & Sieffert, P.A.

(57) ABSTRACT

A centralized document system integrates online document execution and conferencing to control access to precipitant information. Precipitant information includes access codes, personal identification numbers, sensitive information, or any other secured information for which execution of an online document is a prerequisite for access to the secured information. The centralized document system detects precipitant information that is presented during a conference and controls access to the detected precipitant information (e.g., by generating permission rules that specify a type of online document to be executed to gain access). The centralized document system may determine whether a user has executed one or more online documents and thus, has authorization to access the detected precipitant information. Responsive to determining that the user has not executed the online documents, the centralized document system can control access to the precipitant information by modifying the conference (e.g., using censors or breakout rooms).

18 Claims, 9 Drawing Sheets

(51) Int. Cl.
*G06F 16/93* (2019.01)
*H04N 7/15* (2006.01)

(56) References Cited

U.S. PATENT DOCUMENTS

| | | | | |
|---|---|---|---|---|
| 10,878,183 | B2* | 12/2020 | Shimkus | G06F 40/166 |
| 11,210,379 | B1* | 12/2021 | Lindley | G06F 21/645 |
| 2003/0070072 | A1 | 4/2003 | Nassiri | |
| 2010/0205014 | A1* | 8/2010 | Sholer | G06Q 40/08 |
| | | | | 705/4 |
| 2011/0225163 | A1* | 9/2011 | Lyon | G06F 40/169 |
| | | | | 707/E17.089 |
| 2011/0271332 | A1* | 11/2011 | Jones | G06F 3/04883 |
| | | | | 715/753 |
| 2013/0007121 | A1* | 1/2013 | Fontenot | G06Q 10/00 |
| | | | | 709/204 |
| 2013/0246343 | A1* | 9/2013 | Victor | G06F 16/176 |
| | | | | 707/E17.005 |
| 2014/0123318 | A1* | 5/2014 | Belvin | G06F 16/40 |
| | | | | 726/28 |
| 2015/0100503 | A1* | 4/2015 | Lobo | G06Q 10/103 |
| | | | | 705/301 |
| 2016/0099949 | A1* | 4/2016 | Leondires | G06F 21/6218 |
| | | | | 726/28 |
| 2016/0117495 | A1* | 4/2016 | Li | H04L 63/105 |
| | | | | 726/1 |
| 2017/0178074 | A1* | 6/2017 | Marsh | G06F 21/6218 |
| 2018/0293393 | A1* | 10/2018 | Effendi | G06F 21/32 |
| 2019/0026848 | A1* | 1/2019 | Denker | G06F 40/186 |
| 2019/0074976 | A1* | 3/2019 | Hancock | G06F 3/1454 |
| 2019/0121846 | A1* | 4/2019 | Kim | G06F 3/03545 |
| 2019/0236617 | A1 | 8/2019 | Gholston et al. | |
| 2019/0347660 | A1* | 11/2019 | Wilkinson | H04L 9/50 |
| 2020/0250686 | A1* | 8/2020 | Abbuonandi | G06Q 30/0185 |
| 2020/0302940 | A1* | 9/2020 | Herbach | G10L 15/183 |
| 2020/0342131 | A1* | 10/2020 | Giralt | G06F 3/0484 |
| 2020/0395130 | A1* | 12/2020 | Denisova | H04L 12/1813 |
| 2020/0404029 | A1 | 12/2020 | Aggarwal | |
| 2021/0042717 | A1 | 2/2021 | Myshkin et al. | |
| 2021/0111916 | A1 | 4/2021 | Velayutham et al. | |
| 2021/0173854 | A1* | 6/2021 | Wilshinsky | G06F 9/451 |
| 2021/0224419 | A1 | 7/2021 | McBride et al. | |
| 2021/0400142 | A1* | 12/2021 | Jorasch | H04L 65/1069 |
| 2022/0012366 | A1* | 1/2022 | Burceanu | H04L 9/008 |
| 2022/0206644 | A1* | 6/2022 | Spaetzel | G06F 21/64 |
| 2022/0343914 | A1* | 10/2022 | Bonser | G10L 15/02 |
| 2023/0023835 | A1* | 1/2023 | Ouellette | H04W 12/08 |

* cited by examiner

CONFERENCING PLATFORM INTEGRATION WITH INFORMATION ACCESS CONTROL

TECHNICAL FIELD

The disclosure generally relates to the execution of online documents, and more particularly to integrating an online communication platform with the execution of online documents.

BACKGROUND

The ease of sharing information online is accompanied by the difficulty of controlling access to sensitive information. Sharing information consumes network bandwidth, and lacking proper access control to information can unnecessarily waste bandwidth. For example, providing sensitive information to a user of a conventional conferencing system who is unauthorized to access the sensitive information both costs the conventional conferencing system network bandwidth and creates security risks caused by the distribution of sensitive information. In turn, mitigating the created security risks consumes an increasing amount of computational resources as communication channels used to share information increase.

SUMMARY

Systems and methods are disclosed herein for an integration of online document execution and conferencing to control access to precipitant information. Precipitant information includes access codes, personal identification numbers, sensitive information, or any other secured information for which execution of an online document is a prerequisite for access to the secured information. One example of such a document is a non-disclosure agreement. While online document systems can generate online documents that serve as prerequisites for accessing secured information, an online document system that lacks communicative coupling to an online communication platform (e.g., a video conferencing platform) oversight of communication channels such as online conferencing can be limited. Thus, there is a need for controlling access to secured information that can be shared over online communication platforms. In this way, the unnecessary expenditure of network bandwidth can be avoided, security of digital information can be increased, and the unnecessary consumption of computational resources to mitigate security risks can be limited.

A centralized document system detects precipitant information that is presented during a conference and controls access to the detected precipitant information. The centralized document system may determine whether a user has executed one or more online documents and thus, has authorization to access the detected precipitant information. Responsive to determining that the user has not executed the online documents, the centralized document system can control access to the precipitant information by modifying the conference (e.g., using censors or breakout rooms). By providing access, during a conference, to precipitant information when a user has executed an online document and preventing access when the user has not executed the online document, the centralized document system conserves network bandwidth and increases security of the precipitant information.

In one embodiment, the centralized document system determines video conference permission rules indicating conditions under which one or more users execute a type of online document authorizing the one or more users to access sensitive information presented during a video conference. The centralized document system can receive a request from a user to enter the video conference. The centralized document system may determine, using the video conference permission rules, whether the user is to execute the type of online document. Responsive to determining that the user does not need to execute the type of online document, the centralized document system may proceed to allow the user to access the sensitive information presented during the video conference. Responsive to determining the user does need to execute the type of online document, the centralized document system can determine a version of a type of the online document from versions of the online document. The centralized document system may identify an online document of the type and the version. The online document can include an electronic signature field and a name of the user. The centralized document system may determine a status of an electronic signature field in the online document. The electronic signature field may be configured to receive an electronic signature by the user. The centralized document system can determine whether the status indicates that the electronic signature is absent. Responsive to determining that the signature is absent, the centralized document system may prevent the user from accessing the sensitive information during the video conference. Responsive to determining that the signature is present, the centralized document system may proceed to allow the user to access sensitive information presented during the video conference.

The centralized document system may determine video conference permission rules by using a machine-learned model. The centralized document system may generate a feature vector using context information describing one or more of the user or the centralized document system managing execution of online documents (e.g., historical interactions between users and the online documents). The centralized document system may apply the machine-learned model to the feature vector. The machine-learned model can be trained, using historical context information and corresponding conditions under which the type of online document was executed, to determine the video conference permission rules. In some embodiments, determining video conference permission rules includes querying a rules database using context information describing one or more of the user or the centralized document system managing execution of online documents. The centralized document system can receive video conference permission rules from the rules database.

The centralized document system may authorize the user to enter a breakout room of the video conference upon determining the status indicates that the electronic signature is absent. The breakout room may provide a video communication channel between users in the breakout room and an organizer of the video conference. The centralized document system can prevent users in the breakout room from accessing the sensitive information. The centralized document system can generate a redacted version of a content item having the sensitive information presented during the video conference. The redacted version prevents the user from accessing the sensitive information. The centralized document system may present the redacted version of the content item to the user in the breakout room. Upon determining the status indicates that the electronic signature is absent, the centralized document system may identify an electronic address associated with the user and provide the online document to the user using the electronic address. When the status of the electronic signature field in the online documents has changed indicating the electronic signature is present, the centralized document system may approve the request for the user to enter the video conference.

In some embodiments, the centralized document system can determine that sensitive information is to be presented during the video conference. For example, the centralized document system can receive a content item from an organizer of the video conference and parse the content item to determine sensitivity tags associated with sensitive information in the content item. Each of the sensitivity tags can indicate which of the video conference permission rules to apply for a given user to access the sensitive information in the content item. The centralized document system can parse the content item by identifying sensitive key words in the content item, generate a feature vector. The features of the feature vector can include one or more of the sensitive keywords, a date on which the content item is generated, a user identifier of the organizer of the video conference, or user identifiers of invitees of the video conference. The centralized document system can apply a machine-learned model to the feature vector. The machine-learned model can be trained, using historical feature vectors representing sensitive content items shared in historical video conferences, to determine one or more of the sensitivity tags. In some embodiments, the content item includes multiple pages, and parsing the content item to determine sensitivity tags includes identifying, using metadata of the page, that a user-specified sensitivity tag of the various sensitivity tags is present on a page.

The centralized document system can determine the version of the type of online document from various versions of the online document based on historical interactions between the user and online documents generated by the centralized document system. In some embodiments, the centralized document system can determine the version by determining a geographic area where the user is located and determining the version of the online document based on the geographic area. The centralized document system may deny the request for the user to enter the video conference upon determining the status indicates that the electronic signature is absent. The centralized document system may approve the request for the user to enter the video conference and display the sensitive information to the user upon determining the status indicates that the electronic signature is present. Upon determining that the status indicates that the electronic signature is absent, the centralized document system may receive a manual approval of the request from an organizer of the video conference. In turn, the centralized document system may override the denial of the request and display the sensitive information to the user. The type of online document may be a non-disclosure agreement (NDA).

In yet another embodiment, the centralized document system can access a video conference between two or more users. The video conference may include video data of a presentation viewed by the two or more users. The presentation can include precipitant information. The centralized document system may determine whether the precipitant information is detected in the presentation. Responsive to not yet detecting precipitant information, the centralized document system may continue to access the video conference until the precipitant information is detected. Responsive to detecting precipitant information, the centralized document system may identify an online document provided by centralized document system to the user for execution. The centralized document system may use an identifier of a user of the two or more users to identify the online document. The centralized document system can determine a status of an electronic signature field in the online document. The electronic signature field may be configured to receive an electronic signature by the user. The centralized document system may determine whether the status indicates the electronic signature is absent. The centralized document system can allow the user to access the precipitant information in response to determining that the electronic signature is present. The centralized document system may identify an electronic address associated with the user. The centralized document system can provide the electronic signature field to the user using the electronic address. The centralized document system may receive the electronic signature from the user.

The centralized document system can detect the presentation includes the precipitant information by determining, using the video data received during the video conference, that the precipitant information is to be displayed to the two or more users. The centralized document system can create a feature vector using contextual information that includes image frames from the video data. The centralized document system can apply a machine-learned model to the feature vector, where the machine-learned model is configured to identify precipitant information. The centralized document system determines, using the output from the machine-learned model, that the precipitant information is to be displayed to the two or more users. The centralized document system can detect precipitant information is included in the presentation by determining a portion of the presentation that includes an embedded flag associated with precipitant information. The presentation can be generated using a presentation platform communicatively coupled to a conferencing platform hosting the video conference.

The centralized document system can modify, during the video conference, a view of the presentation displayed to the user upon determining the status indicating the electronic signature is absent. The modified view can cause the portion of the presentation from being viewed by the user. In some embodiments, the electronic address is an account identifier associated with a conferencing platform hosting the video conference. The centralized document system may modify, during the video conference, the view of the presentation by generating a notification including the electronic signature field and transmitting the generated notification to the conferencing platform. The conferencing platform may use the account identifier to individually (e.g., exclusively) display the generated notification to the user.

The centralized document system can determine another online document (a second online document) whose execution by the user is a prerequisite to execution of a first online document by the user. The centralized document system can provide the second online document to the user for execution. The online document may be an agreement for authorizing the user to access a portion of the presentation containing precipitant information. In some embodiments, the electronic address is an email address and the centralized document system may provide the electronic signature field to the user using the email address. The precipitant information may be information requiring the user to perform an action before accessing the information. Examples of the precipitant information can include an access code, an attendance code, or sensitive information.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment in which a centralized document system operates, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Centralized Document System Environment

Figure 1:
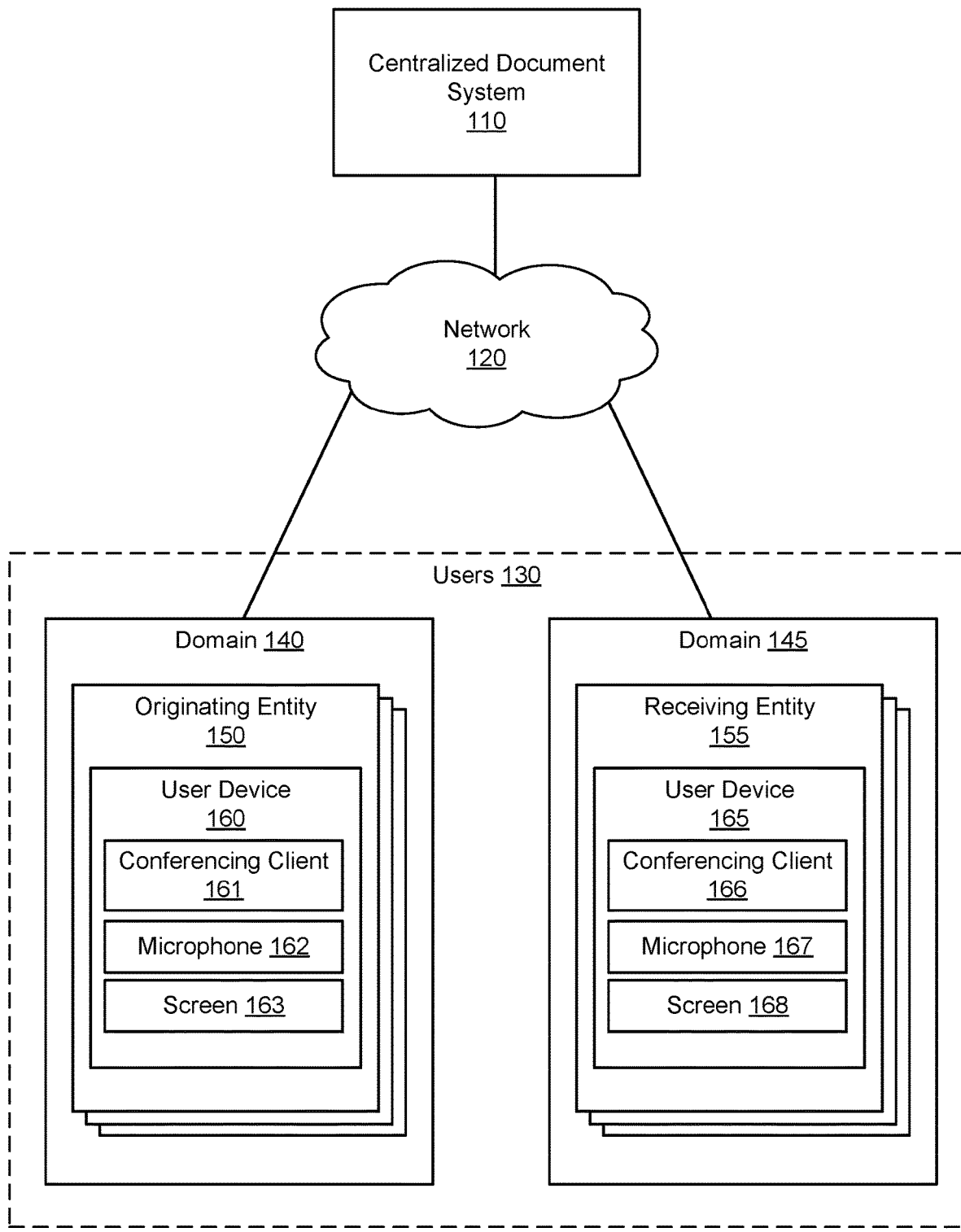

FIG. 1 is a block diagram of system environment 100 in which centralized document system 110 operates, in accordance with one embodiment. System environment 100 includes centralized document system 110, network 120, users 130 which includes a subset of originating entities 150 associated with domain 140 and a subset of receiving entities 155 associated with domain 145. Each of originating entities 150 and receiving entities 155 can be associated with respective user devices (e.g., user device 160 or user device 165). In alternative configurations, different and/or additional components may be included in system environment 100. Although a centralized document system is frequently referred to herein, a de-centralized document system may also perform similar operations attributed to the centralized document system. For example, the operations can be performed at least in part by software applications of a de-centralized document system installed on individual user devices.

Centralized document system 110 is a computer system (or group of computer systems) for storing and managing documents and/or document packages (e.g., envelopes) for users 130. Using centralized document system 110, users 130 can collaborate to create, edit, review, negotiate, and execute documents. Centralized document system 110 allows users 130 to generate and modify a document package, which may also be referred to as a "document envelope" or "envelope." The document package may include at least one document for execution. Centralized document system 110 may provide the at least one document (e.g., a contract, agreement, purchase order, or other suitable document) in which terms have been agreed upon by two or more domains (e.g., by two or more of users 130 from domain 140 and domain 145) to receiving entity 155 of domain 145 for execution, as described above. Centralized document system 110 may generate an envelope per a request from originating entity 150 of domain 140. In some embodiments, centralized document system 110 enforces a set of document permissions for accessing or modifying the envelope.

Centralized document system 110 enables access control to precipitant information presented during a conference. A conference may be an audio and/or video conference hosted online between two or more users. The two or more users may have roles such as a host of the conference and an invitee invited by the host. The two or more users may be referred to as "participants" or "attendees." The terms "host" and "organizer" may be used interchangeably. In some embodiments, a host is a user with default authorization to access the precipitant information that is provided during the conference. Centralized document system 110 can be a server, server group or cluster (including remote servers), or another suitable computing device or system of devices. In some embodiments, centralized document system 110 can communicate with user devices 160 and 165 over the network 120 to receive instructions and send envelopes for access on user devices 160 and 165. Centralized document system 110 is discussed in further detail with respect to FIG. 2.

Network 120 transmits data within system environment 100. Network 120 may comprise any combination of local area and/or wide area networks, using both wired and/or wireless communication systems, such as the Internet. In some embodiments, network 120 transmits data over a single connection (e.g., a data component of a cellular signal, or Wi-Fi, among others), and/or over multiple connections. In some embodiments, network 120 uses standard communications technologies and/or protocols. For example, network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through network 120, centralized document system 110 can communicate with user devices 160 associated with users 130. A user can represent an individual, group, or other entity that is able to interact with envelopes generated and/or managed by centralized document system 110. Each user can be associated with a username, email address, or other identifier that can be used by centralized document system 110 to identify the user and to control the ability of the user to view, modify, and otherwise interact with envelopes managed by centralized document system 110. In some embodiments, users 130 can interact with centralized document system 110 through a user account with centralized document system 110 and one or more user devices 160 and 165 accessible to users 130.

As described above, a domain (e.g., domains 140 and 145) is a business, group, individual, or the like that is associated with a set of users and one or more envelopes in centralized document system 110. For example, an envelope may originate at domain 140 and be sent to domain 145 for viewing, editing, and execution. In one embodiment, the envelope may be created by originating entity 150 and be sent via centralized document system 110 to receiving entity 155 during the execution of the one or more documents included within the envelope.

In the embodiment of FIG. 1, originating entity 150 from domain 140 can create an envelope via centralized document system 110. In this example, domain 140 includes a set of originating entities 150 which, as used herein, are a subset of users 130 who have user accounts with centralized document system 110. Domain 145 includes a set of receiving entities 155 which, as used herein, are a subset of users 130 who have user accounts with centralized document system 110. The envelope is sent by centralized document system 110 for review and execution by a receiving entity of domain 145.

A user device (e.g., user devices 160 and 165) is a computing device capable of receiving user input as well as transmitting and/or receiving data to centralized document system 110 via network 120. For example, a user device can be a desktop or a laptop computer, a smartphone, tablet, or another suitable device. Each user device may have a microphone (e.g., microphones 162 and 167) for receiving audio during a conference. Although not depicted, users may also use peripheral microphones coupled to user devices, where audio can be captured by the peripheral microphones and communicated to centralized document system 110 via user devices coupled to the peripheral microphones. Each user device may have a screen (e.g., screens 163 and 168) for displaying content (e.g., videos, images, content items, or online documents to be executed) during a conference. Although not depicted, users may also use peripheral displays coupled to user devices, where the content displayed during a conference is presented on the peripheral displays. Example peripheral displays include projectors, virtual reality (VR) or augmented reality (AR) headsets, computer monitors, smart televisions, or any suitable peripheral display communicatively coupled to a user device to display conference content.

User devices are configured to communicate via network 120. In one embodiment, a user device executes an application allowing a user of the user device to interact with centralized document system 110. For example, a user device can execute a browser application to enable interaction between the user device and centralized document system 110 via network 120. User devices can store and/or execute conferencing clients (e.g., conferencing clients 161 and 166), which can be software applications allowing users to create and participate in conferences (e.g., teleconferences or video conferences). In some embodiments, a single user can be associated with multiple user devices, and/or one user device can be shared between multiple users who may, for example, log into a personal account on the user device to access centralized document system 110.

Centralized Document System

Figure 2:
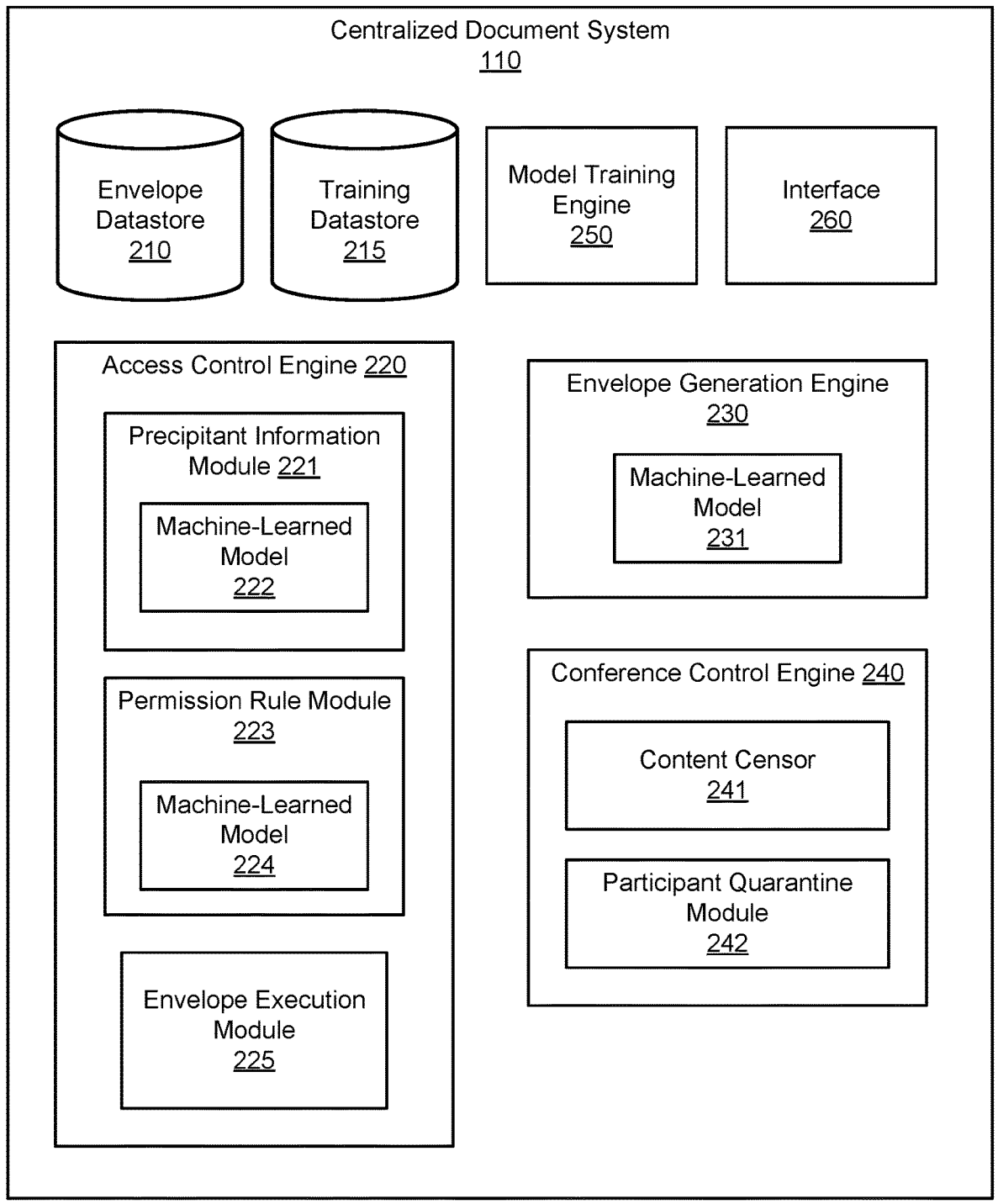
FIG. 2 is a block diagram of the centralized document system of FIG. 1, in accordance with one embodiment.

FIG. 2 is a block diagram of centralized document system 110 of FIG. 1, in accordance with one embodiment. Centralized document system 110 includes or accesses local databases such as envelope datastore 210 and training datastore 215. Centralized document system 110 includes software modules such as access control engine 220, envelope generation engine 230, conference control engine 240, and model training engine 250. Centralized document system 110 includes one or more machine learning models such as machine-learned models 222 and 224. Centralized document system 110 includes interface 260, which may include hardware and/or software components, that enable centralized document system 110 to communicate with user devices or third-party platform servers through network 120. Centralized document system 110 may have alternative configurations than shown in FIG. 2, including different, fewer, or additional components.

Envelope datastore 210 stores envelopes managed by centralized document system 110. Envelopes can include templates of envelopes that may be modified by envelope generation engine 230 to generate a specific version of an envelope for execution, which can also be stored in envelope datastore 210. For example, a template for a non-disclosure agreement can be stored in envelope datastore 210 with modifiable fields for a user's name and dates during which the agreement is effective. Envelopes can include executed envelopes that may be used by envelope execution module 225 to verify that a user meets conditions for accessing precipitant information by virtue of the executed envelopes. Training datastore 215 stores training data to train machine-learned models of centralized document system 110. Training data can include context information about the previously held conferences. The context information can include conference data (e.g., video, audio, and image data of the conference), content items presented or intended to be presented during the conference, and/or logistical information about the conference (e.g., the date on which the conference is held, information about the attendees and hosts such as names, user identifiers, locations, job titles, etc.).

Access control engine 220 determines a user's permissions to access content presented during a conference. Access control engine 220 includes precipitant information module 221, permission rule module 223, and envelope execution module 225. Access control engine 220 can access envelope datastore 210 to verify in response to determining that a user satisfies conditions to access content or to provide an envelope to the user for execution to satisfy the conditions. Access control engine 220 can access training datastore 215 to train machine-learned models used to determine permissions for accessing content.

Precipitant information module 221 determines that precipitant information is present within content presented to a user during a conference. Precipitant information may be information requiring the user to perform an action before accessing the information. Examples of precipitant information may include an access code, an attendance code, sensitive information, or any suitable information that requires conditions be met (e.g., execution of a non-disclosure agreement or completion of a challenge-response test) by a user before the user can access the information. Precipitant information module 221 may determine that precipitant information is currently being presented during a conference or is planned to be presented during a conference.

Precipitant information module 221 may use embedded flags to determine that content presented during a conference contains precipitant information. In some embodiments, centralized document system 110 may be communicatively coupled to a third-party presentation platform (e.g., a software for generating presentations such as MICROSOFT POWERPOINT®). Alternatively or additionally, centralized document system 110 may include software instructions for generating presentations (e.g., the presentations may be a document managed by centralized document system 110). The presentation may be generated (e.g., by either the third-party platform or centralized document system 110) to include embedded flags identifying that there is precipitant information in the presentation. For example, a user may embed a flag into a slide of a presentation that indicates there is confidential information or an attendance code (e.g., for proof of attendance of the presentation) is on the slide. Precipitant information module 221 may detect the presentation or a portion of the presentation (e.g., a slide) includes an embedded flag associated with precipitant information. For example, the third-party presentation platform may transmit a notification to centralized document system 110 that a portion of the presentation having the embedded flag has been reached during the conference (e.g., as a conference host is sharing their device's screen and transitioning through slides of a presentation being shared).

Precipitant information module 221 can receive data from a conference (e.g., video and/or audio data) to analyze for determining the presence of precipitant information in content presented during the conference. Centralized document system 110 can be communicatively coupled to a third-party online communication platform, which is also referred to herein as a conferencing platform (e.g., a video teleconferencing software such as SKYPE® or ZOOM®). Alternatively or additionally, centralized document system 110 can include software instructions for hosting a conference. Precipitant information module 221 may use interface 260 to be communicatively coupled to a third-party conferencing platform. The conference data can include audio data (e.g., as received from microphones of user devices participating in the audio), audio transcripts (e.g., audio converted to text via natural language processing), video data (e.g., videos presented during the conference or recorded screens of participants or hosts in the conference), document data (e.g., documents distributed or shared on a screen during the conference), image data (e.g., image frames of video data, images presented during the conference, or screen captures of screens of participants or hosts in the conference), or any suitable data shared for presentation or presented during the conference.

Precipitant information module 221 can apply the received conference data to a model to determine that precipitant information is to be or is presented during a conference. The model may be a rules-based model defining one or more tests that the conference data may be subject to determine precipitant information is present or a likelihood that precipitant information is present. In one example of a test for a rules-based model, precipitant information module 221 may determine whether a threshold number of keywords are present in image, video, or audio data of the conference. The keywords may be indicative of precipitant content and manually predetermined by users of centralized document system 110. Responsive to the model outputting a likelihood that precipitant information is present, precipitant information module 221 may use a threshold to determine that precipitant information is present when the threshold likelihood is met or exceeded.

In some embodiments, precipitant information module 221 may use machine-learned model 222 to determine that precipitant information is present within content. Precipitant information module 221 may generate a feature vector using context information about the conference. The context information can include conference data (e.g., video, audio, and image data of the conference) and/or logistical information about the conference (e.g., the date on which the conference is held, information about the attendees and hosts such as names, user identifiers, locations, job titles, etc.). Precipitant information module 221 may apply machine-learned model 222 to the generated feature vector. Machine-learned model 222 may be trained by model training engine 250 to output a likelihood of precipitant information included in content presented during the conference. Additional detail regarding the training is provided in the description of model training engine 250.

Permission rule module 223 determines one or more permission rules for accessing precipitant information during a conference. Permission rules may also be referred to herein as a "conference permission rule" or "video conference permission rule." A permission rule may indicate one or more conditions under which users execute a type of online document authorizing the users to access precipitant information during a conference. In some embodiments, permission rule module 223 may query a rules database using context information describing a user listed as a participant in a conference and/or information describing centralized document system 110 managing execution of online documents (e.g., documents needed for accessing precipitant information). Although not depicted in FIG. 2, the rules database may be stored and/or managed at centralized document system 110. The rules database may include a data structure mapping permission rules to one or more conditions that are met to enforce the rule. In one example of querying a rules database, permission rule module 223 determines a user's location (e.g., Berlin) when attending a conference (e.g., using the internet protocol (IP) address of the user's device accessing the conference) and uses the user's location to query the rules database for a rule that specifies that the user must execute a particular type of agreement for attendees in Europe before accessing precipitant information presented during the conference.

In some embodiments, permission rule module 223 may use machine-learned model 224 to generate permission rules. Permission rule module 223 may generate a feature vector using context information about the conference. The context information can include conference data, logical information about the conference, and/or envelope execution history (e.g., as managed by centralized document system 110). For example, the context information can include a user's name, start date of employment associated with a domain, job title, title of the conference, and a history of documents executed by employees of the same domain with the same job title. Permission rule module 223 may apply machine-learned model 224 to the generated feature vector. Machine-learned model 224 may be trained by model training engine 250 to output a likelihood of precipitant information included in content presented during the conference. Additional detail regarding the training is provided in the description of model training engine 250.

Permission rule module 223 may also determine rules using sensitivity tags associated with precipitant information (e.g., sensitive information) of a content item. A content item may be an electronic document (e.g., word processing document, presentation, spreadsheet document, video, image, etc.). Access control engine 220 may receive a content item from a host of a video conference. Permission rule module 223 can parse the content item to determine sensitivity tags associated with sensitive information in the content item. The sensitivity tags may indicate permission rules to apply for users to access the sensitive information in the content item. A creator of the content item may manually tag the content with one or more sensitivity tags. For example, different slides of a presentation may have different sensitivity tags per slide. In another example, a video may be divided into various segments (e.g., a first segment being from a first timestamp to a second timestamp and a second segment being from a second timestamp to a third timestamp), with each segment tagged with a respective sensitivity tag. Examples of sensitivity tags may include qualitative tags such as "low," "medium," or "high" or quantitative tags such as "1," "2," or "3." In some embodiments, permission rule module 223 can determine, for one or more of portions of a content item (e.g., pages of a text document, slides of a presentation, etc.), identify, using metadata of the portion (e.g., an embedded flag indicating whether a sensitive tag is present on the portion), a user-specified sensitivity tag of the plurality of sensitivity tags is present on the portion.

In some embodiments, sensitivity tags may be automatically generated by precipitant information module 221. For example, precipitant information module 221 may determine context information using a received content item and apply machine-learned model 222 to determine one or more sensitivity tags for the content item. For example, context information is determined for each slide of a presentation content item, machine-learned model 222 outputs a likelihood that each slide contains precipitant information, and permission rule module 223 determines a sensitivity tag for each likelihood (e.g., 0%-30% likelihood maps to a "low" sensitivity tag, 31%-70% likelihood maps to a "medium" sensitivity tag, and 71%-100% maps to a "high" sensitivity tag). The automatically generated sensitivity tags may be used by permission ule module 223 to determine a permission rule (e.g., by querying a database or using machine-learned model 224).

Centralized document system 110 may access a mapping of sensitivity tags to permission rules to determine which permission rule(s) to apply in response to detecting a sensitivity tag with a received content item. For example, a "medium" sensitivity tag may map to a permission rule specifying that an employee with a first security classification (e.g., preliminary security clearance) needs to execute a non-disclosure agreement before viewing the content item while another employee with a second security classification (e.g., top secret) does not need to execute the non-disclosure agreement. The mapping may be preconfigured by a user or available according to a standardized protocol available for access on the Internet by centralized document system 110. Permission rules may vary for different domains, and centralized document system 110 may tailor permission rules for each domain by generating permission rules based on a domain's history of envelopes executed for accessing precipitant information.

Envelope execution module 225 can identify an envelope that is a prerequisite for accessing precipitant information during a conference. In some embodiments, envelope execution module 225 applies permission rules generated by permission rule module 223 to identify the envelope. For example, envelope execution module 225 applies a set of permission rules for a particular domain to determine that a user must execute a particular contract before accessing a certain type of precipitant information (e.g., as identified by precipitant information module 221). In response, envelope execution module 225 determines whether the user has already executed the particular contract and in response to determining that the user has not executed the particular contract, envelope execution module 225 may query the particular contract from the envelope datastore 210.

Envelope execution module 225 may determine a version of an envelope or an online document for a user to execute before accessing precipitant information. A version of an envelope or online document may be a modification to a standard type of envelope or document. For example, a version of an "employment contract" type of online document is a modified version of a standard template for the employment contract, where the modifications include a user's name, a user's start date of employment, salary, additional employment benefits, etc. Envelope execution module 225 may determine a version of an envelope or a version of a type of envelope based on historical interactions (e.g., editing, sending, opening, or signing a document) between a user and envelopes or online documents previously generated by centralized document system 110. For example, envelope execution module 225 may use a statistical model generated using associations between users' user information and document versions executed by the users. In some embodiments, envelope execution module 225 applies context information about the user to determine a version of a document for the user to execute. For example, envelope execution module 225 determines a geographic area where the user is located (e.g., using the IP address of their device accessing the conference), and determines the version of an online document based on the geographic area. Envelope execution module 225 may access preconfigured rules specifying which versions of documents are to be executed depending on context information such as the location of the user.

Envelope execution module 225 may determine whether a user has executed the envelope. In some embodiments, envelope execution module 225 determines a status of an electronic signature field in the envelope (e.g., an online document in the envelope). In one example, centralized document system 110 embeds signature tags in an online document to indicate whether an input to an electronic signature field in the online document has been provided. Envelope execution module 225 may use embedded signature tags to determine whether a user has executed an envelope. Responsive to determining that the user has not executed the envelope, envelope execution module 225 may provide the envelope to the user for execution. Envelope execution module 225 may access an existing envelope from the envelope datastore 210 or instruct envelope generation engine 230 to create an envelope for execution.

Envelope execution module 225 may determine, using a user's user identifier, an envelope that was previously provided to the user. For example, envelope execution module 225 may use a user's email address to identify envelopes that were previously sent (e.g., by centralized document system 110) to that email address for execution. After the user has executed the online document that was emailed to them, envelope execution module 225 may receive the executed online document including the user's electronic signature. In another example, a user's identifier is a user handle associated with a third-party conferencing platform. Envelope execution module 225 may instruct the third-party conferencing platform to create an interactive graphic user interface (GUI) including an electronic signature field for the user to input their electronic signature, where the electronic signature field is associated with an envelope (e.g., metadata of the electronic signature field includes an identifier for the envelope). In response to the user providing their electronic signature at the electronic signature field, envelope execution module 225 may propagate the electronic signature to the envelope such that the user can execute the envelope from the GUI of the third-party conferencing platform. At least through the foregoing examples, envelope execution module 225 may receive an electronic signature from the user.

Envelope execution module 225 may determine that two different online documents need to be executed by a user for the user to access precipitant information in the conference. In some embodiments, after determining that a user has not executed a first envelope for accessing precipitant information, envelope execution module 225 may determine that the execution by the user of a second envelope is a prerequisite to execution of the first online document. Envelope execution module 225 may receive preconfigured relationships or mappings between documents from a user. For example, a user may specify to centralized document system 110 that a non-disclosure agreement is required to be executed before a user can execute an employment agreement that enables the user to access precipitant information shown in a video conference. Envelope execution module 225 may provide the second online document to a user for execution (e.g., emailing the second document to a user).

Envelope execution module 225 may determine that an envelope for execution is being provided to the user via a conferencing platform and propagate an electronic signature received at the conferencing platform to cause the envelope to be executed at centralized document system 110. In one example, during a video conference hosted on a conferencing platform, an originating entity may discuss an envelope that another participant, a receiving entity, is to execute and/or share the display of the envelope originally presented at the user device of the originating entity (e.g., screen sharing the envelope with the receiving entity). Envelope execution module 225 may use context information such as the audio of the conference (e.g., detecting keywords spoken that are associated with the envelope such as the title of the envelope or a type of online document in the envelope) or the video of the conference (e.g., using computer vision to detect the envelope when it is presented via the shared screen of the originating entity's user device) to determine that the envelope for execution is being provided to the receiving entity. The conferencing platform may enable the receiving entity to execute the document using the user device of the receiving entity. In one example, the receiving entity can use the receiving entity's device to remotely control the originating entity's user device and sign the document. In another example, the conferencing platform may generate an electronic signature field at a GUI at the receiving entity's user device, where the electronic signature field is linked to the envelope (e.g., metadata of the field includes an identifier of the envelope). The conferencing platform may receive the user's electronic signature and propagate the electronic signature to envelope execution module 225, which can then use the identifier of the envelope and the propagated electronic signature to execute the envelope.

Envelope generation engine 230 generates an envelope or online document of a particular version and/or type. The generated envelope or online document may include an electronic signature field that the user may interact with (e.g., using their user device) to provide centralized document system 110 with their electronic signature. The generated envelope or online document may also include various information such as a user's name, user's location (e.g., an address), a date on which the envelope or document was created, or any suitable information for inclusion in an envelope to be executed to access precipitant information. In some embodiments, envelope generation engine 230 identifies information that envelope generation engine 230 may populate into a standard template of an envelope to create a version of the envelope. Envelope generation engine 230 may use logistical information about the conference (e.g., as provided by users to a conferencing platform) such as the date on which the conference is held, information about the attendees and hosts such as names, user identifiers, locations, job titles, etc. Envelope generation engine 230 may populate fields of a standard template for an envelope using the identified information. In some embodiments, envelope execution module 225 may apply machine-learned model 231 a feature vector generated using context information to determine a type or version of an envelope or online document to be executed by a user.

Conference control engine 240 controls accessibility of precipitant information at a conferencing interface. Conference control engine 240 includes content censor 241 and precipitant quarantine module 242. Conference control engine 240 may use interface 260 to provide instructions to a third-party conferencing platform to control accessibility of precipitant information. Conference control engine 240 may additionally or alternatively use interface 260 to modify a conferencing platform hosted by centralized document system 110 at a user device.

Content censor 241 may generate a redacted version of a content item that includes precipitant information. The redacted version prevents a user from accessing the precipitant information. In some embodiments, content censor 241 may use the output of machine-learned model 222, classifying the presence and/or location of precipitant information, to determine portions of a content item or conference to redact. In one example, the output of machine-learned model 222 includes bounding boxes around portions of video frames or images from conference data, where precipitant information is determined by machine-learned model 222 to likely be located in the bounding boxes. In another example, the output of machine-learned model 222 indicates that precipitant information is being discussed in a conference by applying the model 222 to an audio transcript of the audio data of the conference. Redaction may be a modification of the audio or display of the conference such that the precipitant information is not recognizable by the user. Redaction can include using black boxes to cover precipitant information, blurring the precipitant information, muting audio of the conference (e.g., for a particular user or all users), or any other suitable change in the audio or display of the conference to prevent a user from accessing precipitant information.

Participant quarantine module 242 may prevent a user from entering a main room of a conference and/or authorize a user to enter a breakout room of the conference. Participant quarantine module 242 may additionally or alternatively transfer a user to the breakout room of the conference. A room of a conference may refer to a partition of conference attendees with the same accessibility to precipitant information. A main room may be used to partition attendees who are authorized to access precipitant content while a breakout room may be used to partition attendees who are not authorized. In some embodiments, a breakout room may provide a communication channel (e.g., video communication channel) between users in the breakout room and an organizer of the conference. The organizer may communicate with users in the breakout room (e.g., use centralized document system 110 to provide an online document for execution) or manually transfer users from the breakout room to the main room (and vice versa).

Model training engine 250 trains machine-learned models of centralized document system 110. Model training engine 250 accesses data for training the models in training datastore 215. Training data can include context information about the previously held conferences. The context information can include conference data (e.g., video, audio, and image data of the conference), content items presented or intended to be presented during the conference, and/or logistical information about the conference (e.g., the date on which the conference is held, information about the attendees and hosts such as names, user identifiers, locations, job titles, etc.). In some embodiments, centralized document system 110 determines content items intended to be presented during the conference by receiving the content items as attachments to conference invitations provided to attendees. Model training engine 250 may submit data for storage in training datastore 215.

Figure 4:
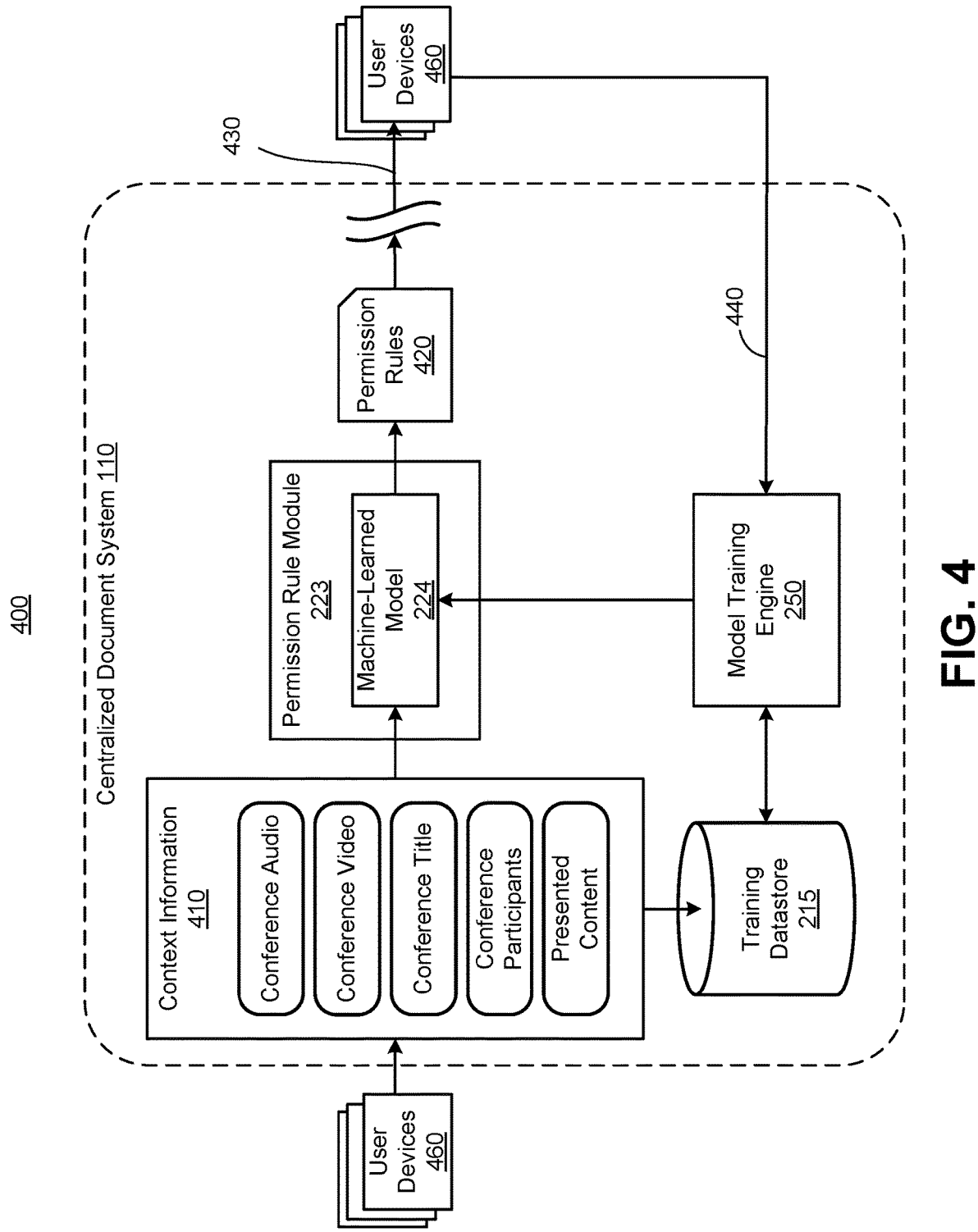
FIG. 4 depicts a block diagram of a process for training a machine-learned model for generating permission rules, in accordance with one embodiment.
Figure 5:
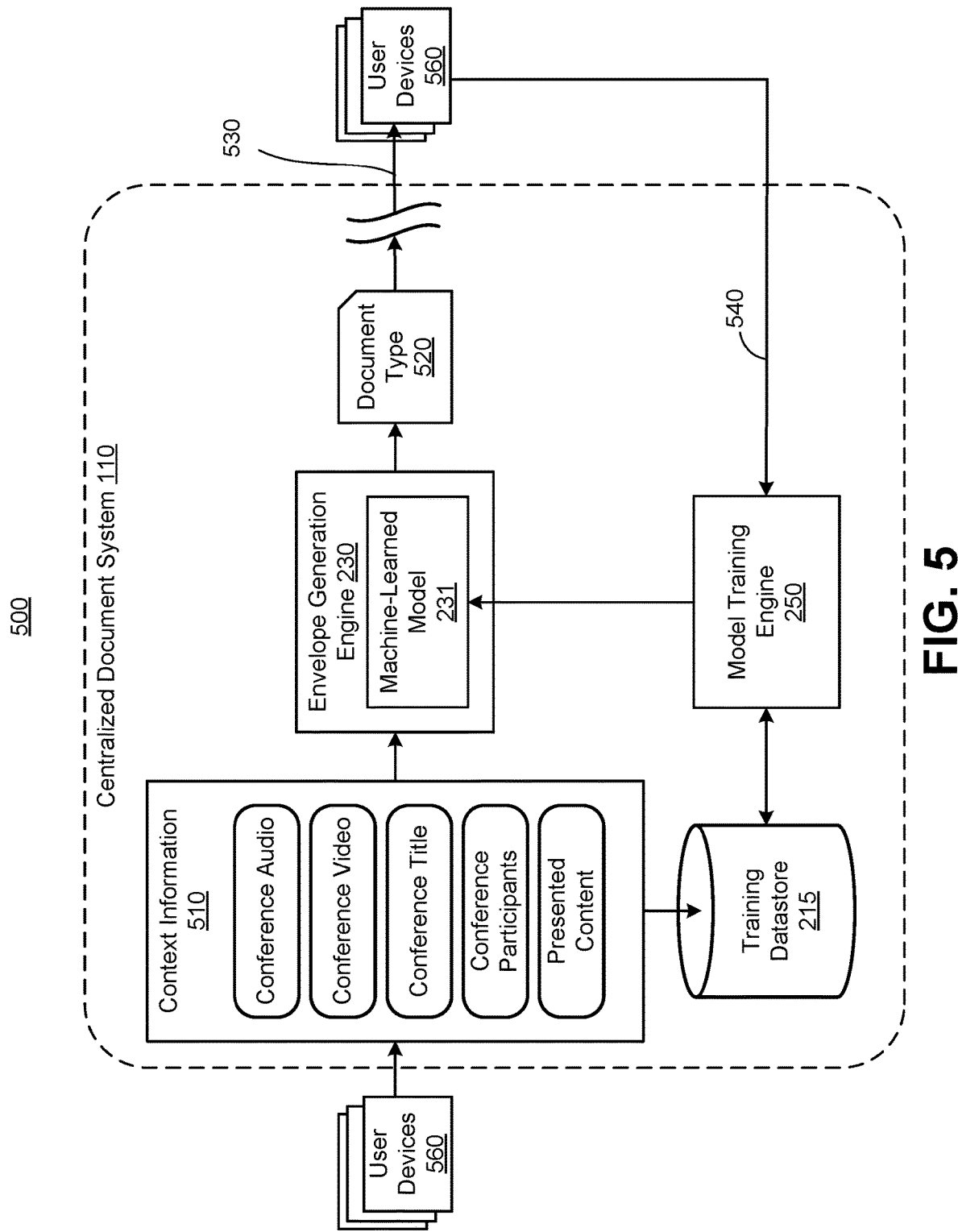
FIG. 5 depicts a block diagram of a process for training a machine-learned model for determining a document type, in accordance with one embodiment.

Model training engine 250 may receive labeled training data from a user or automatically label training data (e.g., using computer vision). Model training engine 250 uses the labeled training data to train a machine-learned model. In some embodiments, model training engine 250 uses training data labeled with indications that precipitant information is present (e.g., binary labels associated with presence and absence of precipitant information) to train machine-learned model 222. Model training engine 250 can use training data labeled with an indication of a permission rule to train machine-learned model 224. Model training engine 250 can use context information labeled with a type or version of an envelope or online document to train machine-learned model 231. Examples of training processes for machine-learned models 224 and 231 are shown in FIGS. 4 and 5, respectively.

In some embodiments, model training engine 250 uses user feedback to re-train machine-learned models. Model training engine 250 may curate what training data to use to re-train a machine-learned model based on a measure of satisfaction provided in the user feedback. For example, model training engine 250 receives user feedback indicating that a user is highly satisfied with the access control by centralized document system 110 of a user who has not executed a necessary document from listening or viewing sensitive information. Model training engine 250 may then strengthen an association between context information and a model output (e.g., sensitivity presence, permission rule, document version, etc.) by creating training data using the context information and machine-learned model outputs associated with the high satisfaction to re-train one or more of the machine-learned models. In some embodiments, the machine learning model 230 attributes weights to training data sets or feature vectors. Model training engine 250 may modify the weights based on received user feedback and re-train the machine-learned models with the modified weights. By training a machine-learned model in a first stage using training data before receiving feedback and a second stage using training data as curated according to feedback, model training engine 250 may train machine-learned models of centralized document system 110 in multiple stages.

Interface 260 is an interface for a user and/or a third-party software platform to interact with centralized document system 110. Interface 260 may be a web application that is run by a web browser at a user device or a software as a service platform that is accessible by the client device through network 120. Interface 260 may be the front-end component of a mobile application or a desktop application. In one embodiment, interface 260 may use application program interfaces (APIs) to communicate with user devices or third-party platform servers, which may include mechanisms such as webhooks.

Figure 3:
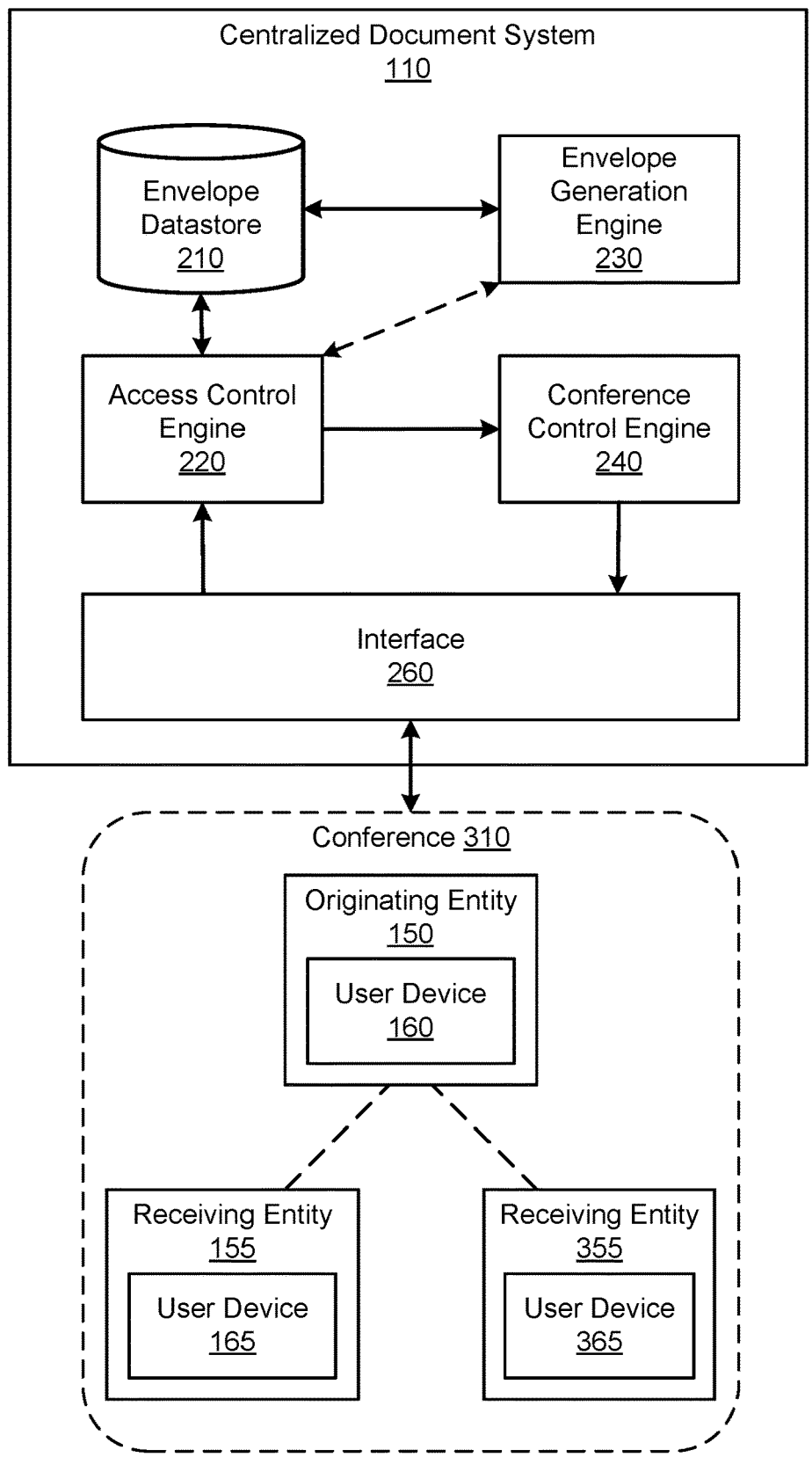
FIG. 3 shows a block diagram of a conference integrated with the centralized document system of FIG. 1, in accordance with one embodiment.

FIG. 3 shows a block diagram of conference 310 integrated with centralized document system 110, in accordance with one embodiment. Conference 310 may be a teleconference (e.g., exclusively audio used for communication between conference participants) or a video conference or video teleconference (e.g., both audio and video is used). Conference 310 includes originating entity 150 as a host using user device 160 to participate in conference 310 (e.g., sharing the information displayed on the screen of user device 160 with the other user devices 165 and 365). Conference 310 includes receiving entities 155 and 355 as invitees using user devices 165 and 365, respectively, to participate in conference 310 (e.g., receiving the information displayed on the screen of user device 160).

In one example, originating entity 150 creates an electronic invitation to attend conference 310 and attaches a content item to the electronic invitation. Centralized document system 110 may receive the electronic invitation before it is distributed to user devices 165 and 365 to determine whether there is precipitant information within the attached content item. Interface 260 may receive the electronic invitation for use by centralized document system 110. Access control engine 220 may determine whether there is precipitant information in the content item, use the logistic information of the electronic invitation (e.g., user identifiers of host and invitees) to determine permission rules for receiving entities 155 and 355 to access the precipitant information, and identify whether receiving entities 155 and 355 have executed necessary envelopes according to the determined permission rules. Access control engine 220 may query envelope datastore 210 to determine whether receiving entities 155 and 355 have already executed the necessary envelopes. In response to determining that receiving entities 155 and 355 have not executed the necessary envelopes, envelope generation engine 230 may create an appropriate version and type of envelope that can be stored in envelope datastore 210 and provided by access control engine 220 (via interface 260) for execution by receiving entities 155 and 355. Until access control engine 220 determines the necessary envelopes have been executed by entities 155 and 355, conference control engine 240 may prevent the precipitant information in the content item attached to the invitation from being accessed by receiving entities 155 and 355. For example, when receiving entities 155 and 355 attempt to open the content item, conference control engine 240 may censor the content item by modifying the appearance of the content item to prevent entities from viewing the precipitant information. Once access control engine 220 determines that the necessary envelopes have been executed by entities 155 and 355, conference control engine 240 may provide the content item and the precipitant information for viewing to entities 155 and 355 (e.g., before, during, or after conference 310 associated with the electronic invitation).

In yet another example, originating entity 150 may be presently hosting conference 310, where entities 155 and 355 are viewing a presentation shared by entity 150 (e.g., via screen sharing). As entity 150 is providing the presentation, centralized document system 110 may receive conference data (e.g., in real time) including audio of conference 310 and video of conference 310 (e.g., the real time video of the screen of user device 160 being shared). Logistic information of conference 310 such as information about the participants in conference 310 (e.g., the IP addresses of user devices participating in conference 310) may also be provided to centralized document system 110. The context information including the conference data and logistic information may be received via interface 260 for use by centralized document system 110. Access control engine 220 may process the context information to determine whether there is precipitant information in the content item, use the context information to determine permission rules for receiving entities 155 and 355 to access the precipitant information, and identify whether receiving entities 155 and 355 have executed necessary envelopes according to the determined permission rules. Access control engine 220 may query envelope datastore 210 to determine whether receiving entities 155 and 355 have already executed the necessary envelopes. In response to determining receiving entities 155 and 355 have not executed the necessary envelopes, envelope generation engine 230 may create an appropriate version and type of envelope that can be stored in envelope datastore 210 and provided by access control engine 220 (via interface 260) for execution by receiving entities 155 and 355. Until access control engine 220 determines the necessary envelopes have been executed by entities 155 and 355, conference control engine 240 may transfer receiving entities 155 and 355 into breakout rooms or censor the precipitant information from display at user devices 165 and 365. Once access control engine 220 determines that the necessary envelopes have been executed by entities 155 and 355, conference control engine 240 may transfer entities 155 and 355 back to the main room of the conference to view the precipitant information or stop censoring the precipitant information.

FIG. 4 depicts a block diagram of process 400 for training machine-learned model 224 for generating permission rules, in accordance with one embodiment. Although interface 260 is not shown for clarity and convenience, interface 260 may communicate data between centralized document system 110 and user devices 460. Centralized document system 110 receives context information 410 related to a conference from user devices 460. Context information 410 includes audio and video from the conference, a title of the conference, conference participants, and content item(s) presented during the conference. Context information 410 is stored in training datastore 215 for access by model training engine 250 to train or re-train machine-learned model 224 of permission rule module 223. As depicted in FIG. 4, machine-learned model 224 is already trained using historical context information stored in training datastore 215. Thus, context information 410 may be processed by permission rule module 223 into a feature vector for input into trained machine-learned model 224, which can then output permission rules 420 for determining whether and what envelope needs to be executed before users of user devices 460 can access precipitant information shown in the conference. Although not fully depicted and represented by break zigzags, the centralized document system 110 can use permission rules 420 to determine envelopes 430 to provide to user devices 460 (e.g., via email or an interface of a conferencing platform) for execution by the users. The users may provide feedback 440 through user devices 460 to indicate a level of satisfaction with envelopes 430. Feedback 440 may indicate a level of satisfaction with how envelopes 430 were generated (e.g., an incorrect type or version was generated), a level of satisfaction with the identification of precipitant information (e.g., centralized document system 110 correctly censored precipitant information in a host's screen being shared or incorrectly transferred users to a breakout room despite necessary documents already executed), or a level of satisfaction with the determination of permission rules (e.g., centralized document system 110 incorrectly generates a rule requiring an executive officer to sign a non-disclosure agreement unnecessarily). Model training engine 250 uses feedback 440 to generate or modify a training set for re-training machine-learned model 224 (e.g., to optimize a cost function of machine-learned model 224). The generated or modified training set may be stored in training datastore 215.

FIG. 5 depicts a block diagram of process 500 for training machine-learned model 231 for determining a document type, in accordance with one embodiment. Although interface 260 is not shown for clarity and convenience, interface 260 may communicate data between centralized document system 110 and user devices 560. Centralized document system 110 receives context information 510 related to a conference from user devices 560. Context information 510 includes audio and video from the conference, a title of the conference, conference participants, and content item(s) presented during the conference. Context information 510 is stored in training datastore 215 for access by model training engine 250 to train or re-train machine-learned model 231 of envelope generation engine 223. As depicted in FIG. 5, machine-learned model 231 is already trained using historical context information stored in training datastore 215. Thus, context information 510 may be processed by envelope generation engine 223 into a feature vector for input into trained machine-learned model 231, which can then output document type 520 for generating envelopes 530 (represented in FIG. 5 via a break zigzag) to be executed before users of user devices 560 can access precipitant information shown in the conference. The users may provide feedback 540 through user devices 560 to indicate a level of satisfaction with envelopes 530. Feedback 540 may indicate a level of satisfaction with how envelopes 530 were generated, a level of satisfaction with the identification of precipitant information, or a level of satisfaction with the determination of permission rules. Model training engine 250 uses feedback 540 to generate or modify a training set for re-training machine-learned model 231 (e.g., to optimize a cost function of machine-learned model 231). The generated or modified training set may be stored in training datastore 215.

Example Conference Integration Applications

Figure 6:
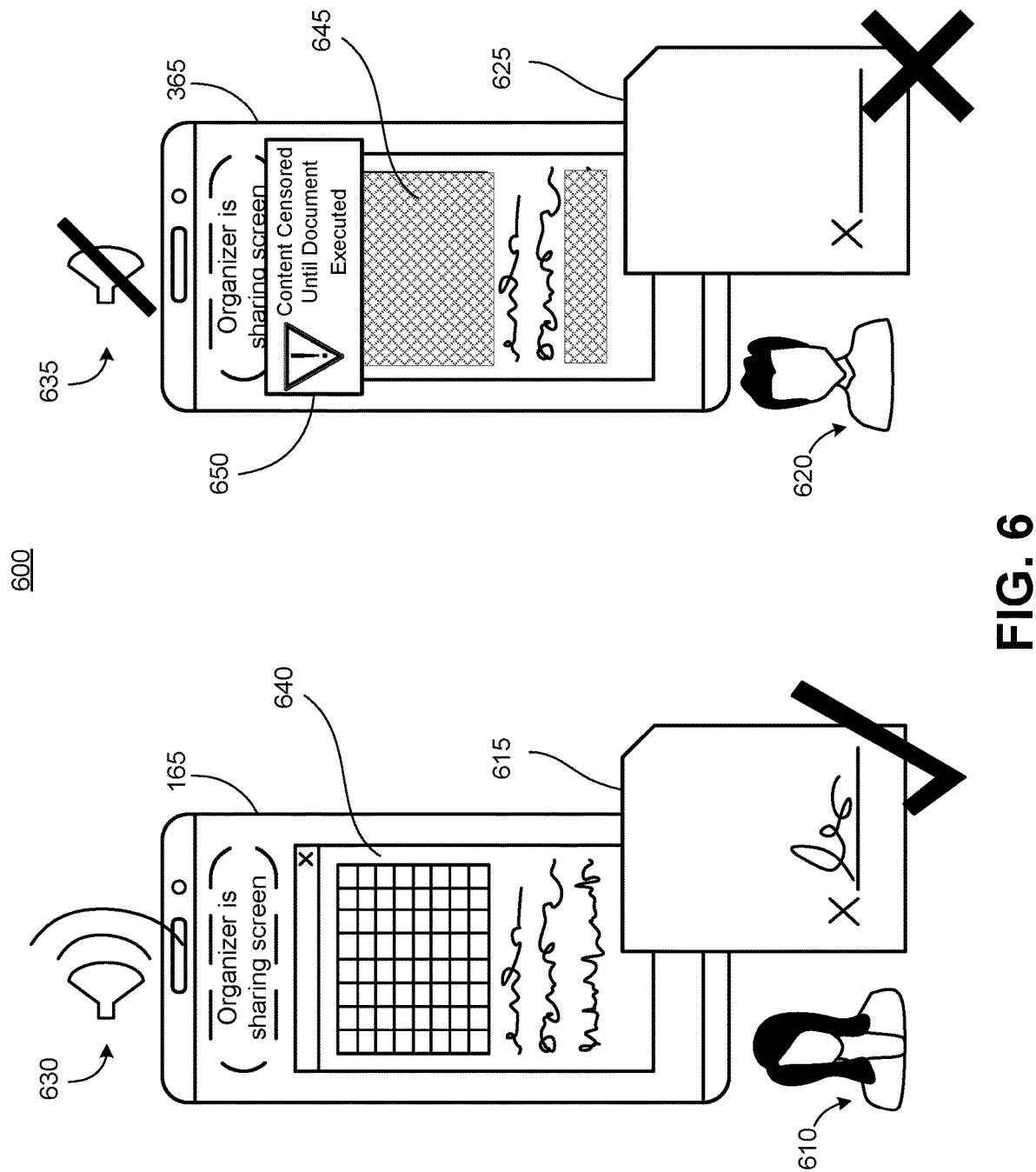
FIG. 6 depicts an example of a redaction of content presented during a conference by the centralized document system of FIG. 1, in accordance with one embodiment.

FIG. 6 depicts example 600 of a redaction of content presented during a conference by centralized document system 110, in accordance with one embodiment. Users 610 and 620 of users 130 may be receiving entities of a type of document (e.g., a non-disclosure agreement) created by centralized document system 110 for execution. For example, centralized document system 110 creates envelope 615 containing a version of a non-disclosure agreement having the name of user 610 and envelope 625 containing a version of the non-disclosure agreement having the name of user 620. Centralized document system 110 determines that envelopes 615 and 625 are required to be executed before users 610 and 620 can access precipitant information presented during the conference. Centralized document system 110 can determine that user 610 has provided an electronic signature and executed envelope 615 while user 620 has not provided an electronic signature and has not executed envelope 625. Centralized document system 110 uses this determine to control what users 610 and 620 have access to during the conference. In particular, centralized document system 110 continues to provide, via user device 165, audio 630 of the conference and video 640 of the host's shared screen to user 610. Centralized document system 110 also modifies the conference as presented to user 620 by causing user device 365 to withhold conference audio (e.g., muting audio 635) and censoring video 645 on the screen of user device 365. Additionally, centralized document system 110 can generate notification 650 that the conference is being censored to prevent access to precipitant information until user 620 executes envelope 625. The graphic user interfaces shown on user devices 165 and 365 of FIG. 6 may be generated by a third-party conferencing platform that is communicatively coupled to centralized document system 110 or by centralized document system 110 using software instructions for executing an internal conferencing application.

Figure 7:
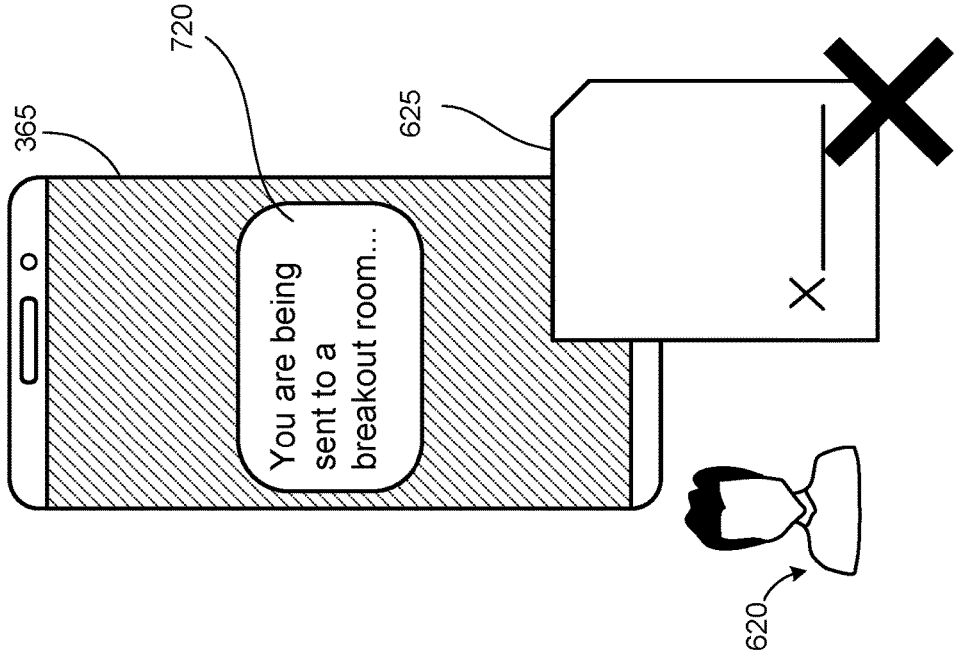
FIG. 7 depicts an example of a creation of a breakout room by the centralized document system of FIG. 1 before a conference begins, in accordance with one embodiment.
Figure 7:
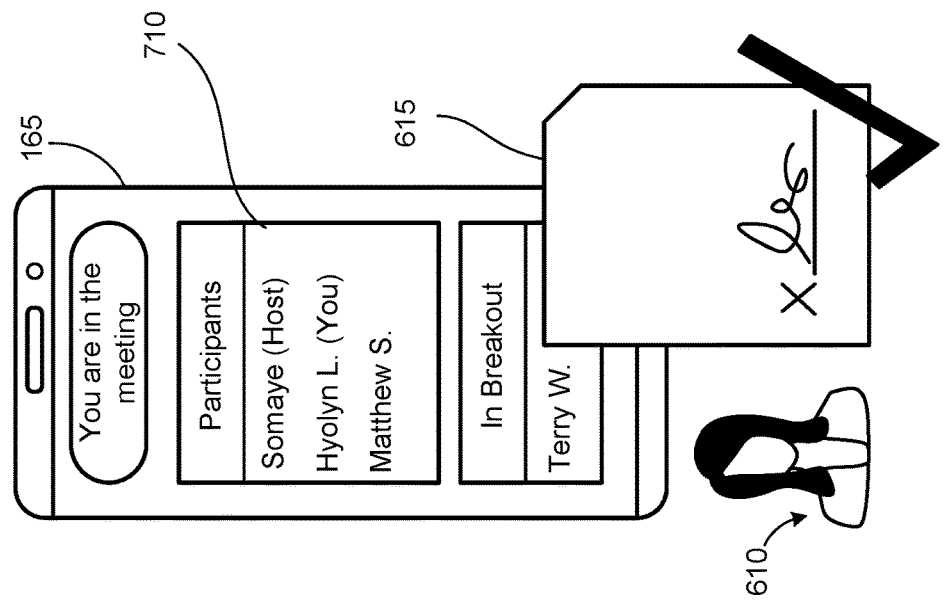

FIG. 7 depicts example 700 of a creation of a breakout room by centralized document system 110 before a conference begins, in accordance with one embodiment. Following FIG. 6, users 610 and 620 of users 130 may be receiving entities of a non-disclosure agreement contained in envelopes 615 and 625. Centralized document system 110 determines that envelopes 615 and 625 are required to be executed before users 610 and 620 can access precipitant information presented during the conference. Centralized document system 110 determines that user 610 has executed envelope 615 while user 620 has not. To control access of precipitant information that is to be shown during the conference, centralized document system 110 transfers user 620 to a breakout room while precipitant information is being presented during the conference. Centralized document system 110 may generate notification 720 informing user 620 that they are being transferred to a breakout room. By contrast, because user 610 has executed envelope 615, centralized document system 110 fulfills the user's request to participate in the conference and user 610 is put a main room of the conference where other participants are participating in the conference. Centralized document system 110 may generate list 710 of participants for display on user device 165, including user 610. Centralized document system 110 may enable participants to view those who have been sent to a breakout room. In example 700, the conference has not yet begun and centralized document system 110 can transfer a user to a breakout room to prevent precipitant information from being accessed. However, in other embodiments, centralized document system 110 can also detect precipitant information is presented in substantially real time during a conference and transfer a user to a breakout room upon detecting the precipitant information. The graphic user interfaces shown on user devices 165 and 365 of FIG. 6 may be generated by a third-party conferencing platform that is communicatively coupled to centralized document system 110 or by centralized document system 110 using software instructions for executing an internal conferencing application.

Example Processes Using Centralized Document System

Figure 8:
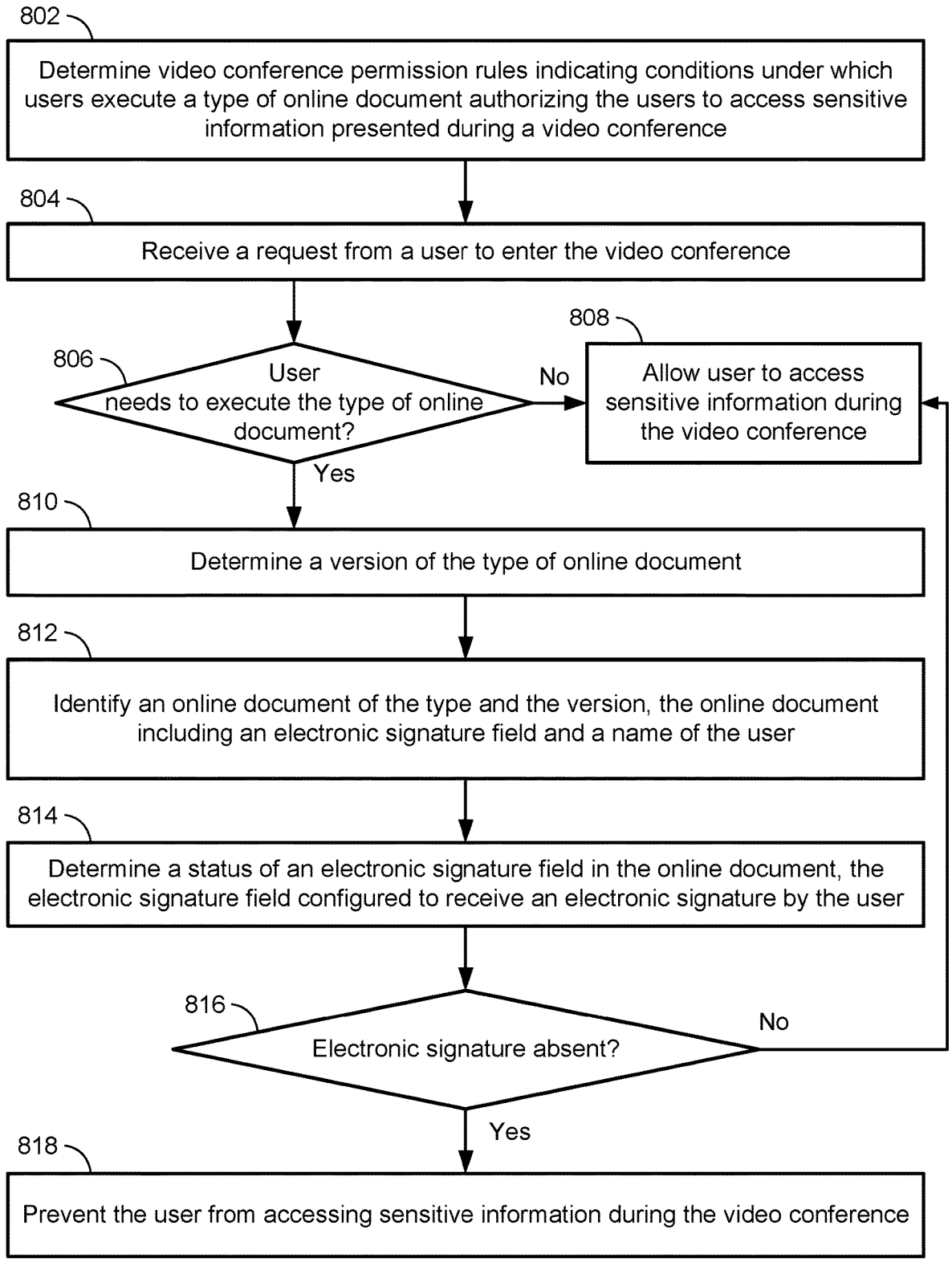
FIG. 8 is a flowchart illustrating a process for controlling access to sensitive information presented during a video conference, in accordance with one embodiment.

FIG. 8 is a flowchart illustrating process 800 for controlling access to sensitive information presented during a video conference, in accordance with one embodiment. Centralized document system 110 may perform process 800. In some embodiments, centralized document system 110 performs operations of process 800 in parallel or in different orders, or may perform different steps.

Centralized document system 110 determines 802 video conference permission rules indicating conditions under which one or more users execute a type of online document authorizing the one or more users to access sensitive information presented during a video conference. The permission rules may specify that users accessing the video conference from a particular location (e.g., Europe) are to execute an updated legal agreement before accessing sensitive information presented during the video conference. Centralized document system 110 receives 804 a request from a user to enter the video conference. For example, centralized document system 110 receives a forwarded request from a server of a third-party conferencing platform that a user device of the user has requested to access audio and video data of the conference (e.g., after the user has selected a hyperlink associated with the server of the third-party conferencing platform hosting the video conference).

Centralized document system 110 determines 806, using the video conference permission rules, whether the user is to execute the type of online document. For example, centralized document system 110 may determine from the IP address of the user device used to access the video conference that the user device is located in Berlin. Centralized document system 110 may apply permission rules to determine that the user is to execute the updated legal agreement before accessing sensitive information presented during the video conference. However, in response to determining that the user does not need to execute the type of online document (e.g., if instead, the user device was not located within Europe), centralized document system 110 allows 808 a user to access the sensitive information during the video conference.

Centralized document system 110 determines 810 a version of a type of online document from different versions of the online document. Centralized document system 110 may create multiple versions of the online document. For example, centralized document system 110 creates a version of the updated legal agreement with language specifying a particular European country that a user might be located in. Centralized document system 110 may determine the version naming Germany (e.g., among various versions for other European countries) in the updated legal agreement because the user device is located in Berlin. Centralized document system 110 identifies 812 an online document of the type and the version. The online document can include an electronic signature field and a name of the user. Centralized document system 110 can identify 812 the online document by selecting the online document from pre-generated documents stored in envelope datastore 210. Additionally or alternatively, centralized document system 110 can identify 812 the online document by generating the online document using a template for the type of document and modifying the document to include appropriate language. For example, centralized document system 110 accesses a template for the updated legal agreement with a field blank where a name of a European country may be populated, and populates the blank field with "Germany" for execution by the user in Berlin.

Centralized document system 110 determines 814 a status of an electronic signature field in the online document. The status may be a signature flag indicating that the signature is present or absent. The electronic signature field may be configured to receive an electronic signature by the user. Centralized document system 110 determines 816 whether the status indicates that the electronic signature is absent. Responsive to determining that the signature is absent, the centralized document system 110 prevents 818 the user from accessing the sensitive information during the video conference. For example, centralized document system 110 determines that the user has not signed the updated legal agreement and cannot be admitted to the video conference. Thus, centralize document system 110 prevents the user from accessing the sensitive information provided during the video conference.

Figure 9:
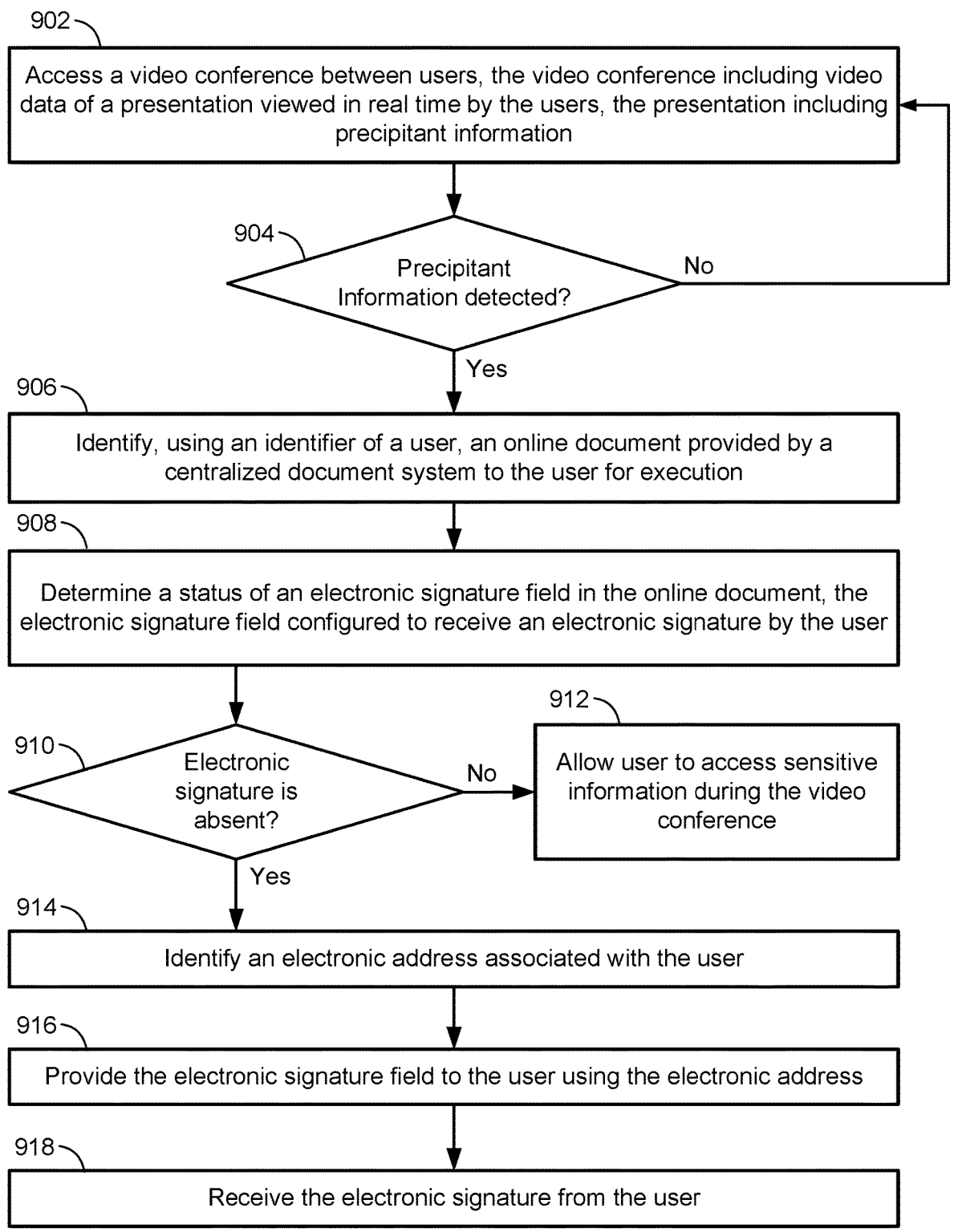
FIG. 9 is a flowchart illustrating a process for providing an online document for execution after detecting precipitant information is presented during a video conference, in accordance with one embodiment.

FIG. 9 is a flowchart illustrating process 900 for providing an online document for execution after detecting precipitant information is presented during a video conference, in accordance with one embodiment. Centralized document system 110 may perform process 900. In some embodiments, centralized document system 110 performs operations of process 900 in parallel or in different orders, or may perform different steps.

Centralized document system 110 accesses 902 a video conference between two or more users. The video conference can include video data of a presentation viewed in substantially real time by the two or more users. The presentation may include precipitant information, such as sensitive information or an access code, that can require an envelope to be executed before a user can access the precipitant information. Centralized document system 110 determines 904 whether the precipitant information is detected in the presentation. For example, as a host of the video conference presents a presentation slide by slide, centralized document system 110 may continuously determine, as the slides are being presented, whether precipitant information is detected in the currently presented slide. Responsive to determining that the precipitant information is not yet detected, the centralized document system 110 may continue to access the video conference to determine whether precipitant information is being presented.

If centralized document system 110 determines 904 that precipitant information has been detected in the presentation (e.g., currently presented slide), centralized document system 110 can proceed to identifying 908 an online document provided by centralized document system 110 to the user for execution. Centralized document system 110 may use an identifier of a user of the two or more users to identify the online document. For example, centralized document system 110 may use a user's email address to determine an online document that was previously provided, by centralized document system 110, to the user for execution. Centralized document system 110 determines 910 a status of an electronic signature field in the online document. The electronic signature field may be configured to receive an electronic signature by the user. The status may be a signature tag in the online document that was embedded by centralized document system 110. The signature tag may have an initial value indicating an electronic signature is absent and can be modified after a user interacts with the electronic signature field to submit the electronic signature, causing the value of the signature tag to indicate the signature is present.

Centralized document system 110 determines 912 whether the status indicates the electronic signature is absent. Responsive to determining that the signature is present, centralized document system 110 allows 914 the user to access the precipitant information. Responsive to determining that the signature is absent, centralized document system 110 identifies 916 an electronic address associated with the user. Centralized document system 110 provides 918 the electronic signature field to the user using the electronic address. In one example, the electronic address may be a handle or account identifier that the user has with a third-party conferencing platform. Centralized document system 110 may instruct the third-party conferencing platform to generate, on the user interface for the conference, an electronic signature field at the user device corresponding to the handle or account identifier. Centralized document system 110 can use the electronic signature field generated at the user interface for the conference to receive the user's electronic signature.

Centralized document system 110 receives 920 the electronic signature from the user and may allow the user to access the precipitant information being presented or the precipitant information that was presented. For example, while the user was reviewing and executing a prerequisite envelope, centralized document system 110 may record the audio and/or video of the video conference that included precipitant information so that the user may go back and view or listen to the portion of the video conference that the user missed while executing the prerequisite envelope.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Where values are described as "approximate" or "substantially" (or their derivatives), such values should be construed as accurate +/−10% unless another meaning is apparent from the context. From example, "approximately ten" should be understood to mean "in a range from nine to eleven." The term "substantially real time" should be understood to mean within 10% a second from real time unless another meaning is apparent from the context. For example, receiving a video feed in substantially real time may account for a lag of at most 0.1 seconds.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving a content item from a user device associated with an organizer of a video conference, the content item to be presented in the video conference;
    identifying a plurality of sensitive keywords in the content item;
    generating a feature vector, wherein features of the feature vector include one or more of the plurality of sensitive keywords, and at least one of: a user identifier of the organizer of the video conference, or a plurality of user identifiers of invitees of the video conference;
    determining one or more of a plurality of sensitivity tags by applying a machine-learned model to the feature vector, each of the plurality of sensitivity tags indicating one or more video conference permission rules to apply for a given user to access sensitive information in the content item, the machine-learned model trained using historical feature vectors representing sensitive content items shared in historical video conferences;
    receiving, by the one or more processors, from a user device associated with a user, a request to enter the video conference, wherein the user is associated with the user identifier of the organizer of the video conference or a user identifier of the plurality of user identifiers of the invitees of the video conference;
    in response to determining, by the one or more processors, using the one or more video conference permission rules, that the user is to execute a type of online document as a prerequisite to enter the video conference:
        determining, by the one or more processors, a version of the type of online document from a plurality of versions of the type of online document; and
        identifying, by the one or more processors, an online document of the type and the version, the online document including an electronic signature field and a name of the user;
    determining, by the one or more processors, a status of an electronic signature field in the online document, the electronic signature field configured to receive an electronic signature by the user; and
    in response to the status indicating the electronic signature is absent:
        preventing the user from accessing the sensitive information during the video conference.

2. The method of claim 1,
    wherein generating the feature vector further comprises generating the feature vector using context information describing one or more of the user or a centralized document system managing execution of a plurality of online documents; and
    wherein determining the one or more of the plurality of sensitivity tags further comprises determining the video conference permission rules by applying the machine-learned model to the feature vector, the machine-learned model trained, using historical context information and corresponding conditions under which the type of online document was executed.

3. The method of claim 1, further comprising: determining the video conference permission rules by:
    querying a rules database using context information describing one or more of the user or a centralized document system managing execution of a plurality of online documents; and
    receiving the video conference permission rules from the rules database.

4. The method of claim 1, further comprising, in response to the status indicating the electronic signature is absent:
    identifying an electronic address associated with the user device associated with the user;

providing the online document to the user device associated with the user using the electronic address; and in response to determining the status of the electronic signature field in the online document has changed indicating the electronic signature is present, approving the request for the user to enter the video conference.

5. The method of claim 1, wherein the content item includes a plurality of pages, and wherein parsing the content item to determine the plurality of sensitivity tags comprises:

for one or more of the plurality of pages, identifying, using metadata of the page, a user-specified sensitivity tag of the plurality of sensitivity tags is present on the page.

6. The method of claim 1, wherein determining the version of the type of online document from the plurality of versions of the online document is based on historical interactions between the user and a plurality of online documents generated by a centralized document system.

7. The method of claim 1, wherein determining the version of the online document from the plurality of versions of the online document comprises:

determining a geographic area where the user is located; and determining the version of the type of online document based on the geographic area.

8. The method of claim 1, further comprising:

in response to the status indicating the electronic signature is absent: denying the request for the user to enter the video conference; and in response to the status indicating the electronic signature is present:

approving the request for the user to enter the video conference; and displaying the sensitive information to the user.

9. The method of claim 8, further comprising, in response to the status indicating the electronic signature is absent:

in response to receiving a manual approval of the request from an organizer of the video conference:

overriding the denying of the request by approving the request for the user to enter the video conference; and outputting, for display at the user device associated with the user, the sensitive information to the user.

10. The method of claim 1, wherein the type of online document is a non-disclosure agreement (NDA).

11. A non-transitory computer-readable storage medium storing executable instructions that, when executed by one or more processors, cause the one or more processors to perform operations, the instructions comprising instructions to:

receive a content item from a user device associated with an organizer of a video conference, the content item to be presented in the video conference;

identify a plurality of sensitive keywords in the content item;

generate a feature vector, wherein features of the feature vector include one or more of the plurality of sensitive keywords, and at least one of a user identifier of the organizer of the video conference, or a plurality of user identifiers of invitees of the video conference;

determine one or more of a plurality of sensitivity tags by applying a machine-learned model to the feature vector, each of the plurality of sensitivity tags indicating one or more video conference permission rules apply for a given user to access sensitive information in the content item, the machine-learned model trained, using historical feature vectors representing sensitive content items shared in historical video conferences;

receive from a user device associated with a user, a request to enter the video conference wherein the user is associated with the user identifier of the organizer of the video conference or a user identifier of the plurality of user identifiers of the invitees of the video conference;

in response to determining, using the one or more video conference permission rules, that the user is to execute a type of online document as a prerequisite to enter the video conference:

determine a version of the type of online document from a plurality of versions of the type of online document; and identify an online document of the type and the version, the online document including an electronic signature field and a name of the user;

determine a status of an electronic signature field in the online document, the electronic signature field configured to receive an electronic signature by the user; and in response to the status indicating the electronic signature is absent:

prevent the user from accessing the sensitive information during the video conference.

12. The non-transitory computer-readable storage medium of claim 11, wherein the instructions to generate the feature vector further comprise instructions to generate the feature vector using context information describing one or more of the user or a centralized document system managing execution of a plurality of online documents; and wherein the instructions to determine the one or more of the plurality of sensitivity tags further comprise instructions to determine the video conference permission rules by applying a machine-learned model to the feature vector, the machine-learned model trained, using historical context information and corresponding conditions under which the type of online document was executed.

13. A centralized document system comprising one or more processors and a non-transitory computer-readable storage medium storing instructions that, when executed by the one or more processors, cause the centralized document system to perform operations, the instructions comprising instructions to:

receive a content item from a user device associated with an organizer of a video conference, the content item to be presented in the video conference;

identify a plurality of sensitive keywords in the content item;

generate a feature vector, wherein features of the feature vector include one or more of the plurality of sensitive keywords, and at least one of a user identifier of the organizer of the video conference, or a plurality of user identifiers of invitees of the video conference;

determine one or more of a plurality of sensitivity tags by applying a machine-learned model to the feature vector, each of the plurality of sensitivity tags indicating one or more video conference permission rules to apply for a given user to access sensitive information in the content item, the machine-learned model trained using historical feature vectors representing sensitive content items shared in historical video conferences;

receive, from a user device associated with a user, a request to enter the video conference, wherein the user is associated with the user identifier of the organizer of the video conference or a user identifier of the plurality of user identifiers of the invitees of the video conference;

in response to determining, using the one or more video conference permission rules, that the user is to execute a type of online document as a prerequisite to enter the video conference:
- determine a version of the type of online document from a plurality of versions of the type of online document; and
- identify an online document of the type and the version, the online document including an electronic signature field and a name of the user;

determine a status of an electronic signature field in the online document, the electronic signature field configured to receive an electronic signature by the user; and in response to the status indicating the electronic signature is absent:
- prevent the user from accessing the sensitive information during the video conference.

14. The centralized document system of claim 13,
wherein the instructions to generate the feature vector further comprise instructions to generate the feature vector using context information describing one or more of the user or a centralized document system managing execution of a plurality of online documents; and wherein the instructions to determine the one or more of the plurality of sensitivity tags further comprise instructions to determine the video conference permission rules by applying a machine-learned model to the feature vector, the machine-learned model trained, using historical context information and corresponding conditions under which the type of online document was executed.

15. The method of claim 1, further comprising, in response to the status indicating the electronic signature is absent, authorizing the user to enter a breakout room of the video conference, the breakout room providing a video communication channel between users in the breakout room and an organizer of the video conference, the users in the breakout room prevented from accessing the sensitive information.

16. The method of claim 15, further comprising:
generating a redacted version of the content item having the sensitive information presented during the video conference, wherein the redacted version prevents the user from accessing the sensitive information; and
outputting, for display at the user device associated with the user, the redacted version of the content item in the breakout room.

17. The non-transitory computer-readable storage medium of claim 11, wherein the instructions further comprise instructions to:
in response to the status indicating the electronic signature is absent, authorize the user to enter a breakout room of the video conference, the breakout room providing a video communication channel between users in the breakout room and an organizer of the video conference, the users in the breakout room prevented from accessing the sensitive information.

18. The centralized document system of claim 13, wherein the instructions further comprise instructions to:
in response to the status indicating the electronic signature is absent, authorize the user to enter a breakout room of the video conference, the breakout room providing a video communication channel between users in the breakout room and an organizer of the video conference, the users in the breakout room prevented from accessing the sensitive information.

* * * * *